(12) United States Patent
Takamura et al.

(10) Patent No.: US 7,097,021 B2
(45) Date of Patent: Aug. 29, 2006

(54) RUNNING CONTROL DEVICE FOR INDUSTRIAL VEHICLE

(75) Inventors: Masayuki Takamura, Tochigi (JP); Takeo Kato, Kanagawa (JP); Takayuki Mori, Kanagawa (JP)

(73) Assignees: Komatsu Forklift Co., Ltd., Oyama (JP); Komatsu Ltd., Tokyo (JP)

( * ) Notice: Subject to any disclaimer, the term of this patent is extended or adjusted under 35 U.S.C. 154(b) by 0 days.

(21) Appl. No.: 10/795,334

(22) Filed: Mar. 9, 2004

(65) Prior Publication Data

US 2004/0180753 A1    Sep. 16, 2004

(30) Foreign Application Priority Data

Mar. 10, 2003  (JP)  ............................. 2003-062921

(51) Int. Cl.
*B10W 10/10*    (2006.01)

(52) U.S. Cl. ...................... 192/219; 192/221

(58) Field of Classification Search .................. 477/71, 477/73, 70, 74, 79, 80, 86; 192/219, 221
See application file for complete search history.

(56) References Cited

U.S. PATENT DOCUMENTS

| | | | |
|---|---|---|---|
| 4,248,330 A | | 2/1981 | Audiffred, Jr. et al. |
| 4,300,652 A | * | 11/1981 | Redzinski et al. .......... 180/336 |
| 4,747,326 A | * | 5/1988 | Braun ........................ 477/108 |
| 4,768,636 A | * | 9/1988 | Ito et al. ...................... 477/71 |

(Continued)

FOREIGN PATENT DOCUMENTS

JP    2002-079926 A    3/2002

OTHER PUBLICATIONS

English translation of a communication issued in corresponding Japanese patent application on Aug. 30, 2005.

*Primary Examiner*—Rodney H. Bonck
*Assistant Examiner*—Justin K. Holmes
(74) *Attorney, Agent, or Firm*—Posz Law Group, PLC; R. Eugene Varndell, Jr.

(57) ABSTRACT

The present invention provides a running control device for an industrial vehicle which generates no speed change shock when the traveling direction is switched to the opposite direction by the forward-reverse selection member during the running of the vehicle. The running control device comprises a forward-reverse selected direction detection sensor which detects the selected traveling direction, a transmission which has a forward clutch and a reverse clutch that switch the traveling direction between the forward direction and reverse direction, and which transmits the driving torque of the engine to the driving wheels via the clutches, a brake which applies braking to the vehicle, a vehicle speed sensor which detects the vehicle speed, and a controller which gradually decelerates the vehicle by means of the brake when the selected traveling direction that has been detected is switched, and controls the engaging force of the forward or reverse clutch corresponding to the selected traveling direction and the braking force of the brake before the detected vehicle speed reaches zero, thus controlling the deceleration torque and acceleration torque so that the fluctuation in the acceleration around the point of time at which the traveling direction is reversed is weakened.

2 Claims, 2 Drawing Sheets

U.S. PATENT DOCUMENTS

| | | | |
|---|---|---|---|
| 4,914,983 A * | 4/1990 | Simonyi et al. | 477/154 |
| 5,097,724 A * | 3/1992 | Braun | 477/73 |
| 5,353,662 A * | 10/1994 | Vaughters | 74/336 R |
| 5,588,515 A | 12/1996 | Toyama et al. | |
| 5,875,680 A * | 3/1999 | Lorriette | 74/335 |
| 5,983,149 A * | 11/1999 | Tate et al. | 701/48 |
| 6,162,146 A * | 12/2000 | Hoefling | 477/73 |
| 6,246,944 B1 * | 6/2001 | Maruyama | 701/70 |
| 6,811,015 B1 * | 11/2004 | Tietze | 192/219 |
| 2002/0129602 A1 * | 9/2002 | Tsubouchi | 60/562 |

* cited by examiner

RUNNING CONTROL DEVICE FOR INDUSTRIAL VEHICLE

BACKGROUND OF THE INVENTION

1. Field of the Invention

The present invention relates to a running control device for an industrial vehicle such as a forklift or the like.

2. Description of the Related Art

In order to improve driving operability and perform work with good efficiency, vehicles equipped with a torque converter and a transmission having clutches used for switching between forward and reverse and for speed stage changes are widely used as industrial vehicles such as forklifts and the like. In the case of such industrial vehicles, an operation in which the forward-reverse lever is switched from the current traveling direction of the vehicle to the opposite direction is frequently performed during the running of the vehicle; in this case, it is necessary to ensure that the vehicle can run smoothly without any shock during forward-reverse changeover.

For example, a technique which is devised so that when the forward-reverse operating lever is switched over, operating oil is supplied to the braking device so that the vehicle is decelerated until the vehicle is reversed to the traveling direction selected by the forward-reverse operating lever, and the brakes are then let off after the traveling direction has been reversed, has been proposed as one conventional control method technique for solving this problem (e.g., see Japanese Patent Application Laid-Open No. 2002-79926 (pages 5–6, FIGS. 3–4). According to this patent application, when, for example, the forward-reverse operating lever is switched from the "forward position" to the "reverse position", braking is applied by the braking force of the brake corresponding to the vehicle speed so that the vehicle is caused to decelerate; then, when the traveling direction is switched to the reverse direction after the vehicle stops, and the vehicle begins to travel in the reverse direction, the "forward travel" signal in the brake control circuit is switched "off", so that a specified relay is switched "off". As a result, the control oil is cut off, so that the brake is released.

However, when the abovementioned conventional technique disclosed in Japanese Patent Application Laid-Open No. 2002-79926 is used, although the braking force is actuated in accordance with the vehicle speed, this braking force is actuated until the vehicle speed reaches zero, and when the brake is subsequently let off, there is an operating delay time until the brake is completely released; accordingly, with the vehicle speed of zero as a boundary, the braking torque acts in the opposite direction from the vehicle acceleration torque. In other words, for a speed change without any shock, it is necessary that the fluctuation in the acceleration and deceleration of the vehicle itself during the speed change be small; however, in the abovementioned technique, since the braking torque constantly acts as a braking torque, the acceleration of the vehicle itself is caused to fluctuate greatly by the effect of this braking torque when the traveling direction of the vehicle is reversed. Consequently, the following problem arises: namely, a speed change shock is generated in the vicinity of a vehicle speed of zero, so that a smooth speed change operation cannot be accomplished. Furthermore, since the driving force of the hydraulic clutch is forcibly suppressed by the brake after the traveling direction is reversed, the following problem arises: namely, not only is there an energy loss, but also a drop in the durability of the brake and hydraulic clutch.

SUMMARY OF THE INVENTION

The present invention was devised with a focus on the abovementioned problem points; it is an object of the present invention to provide a running control device for an industrial vehicle in which no speed change shock is generated when the traveling direction of the vehicle is switched to the opposite direction by the forward-reverse selection means during the running of the vehicle.

In order to achieve the abovementioned object, the first aspect of the present invention provides a running control device for an industrial vehicle comprising: a forward-reverse selected direction detection sensor which detects a traveling direction selected by forward-reverse selection means; a transmission which has a forward clutch and a reverse clutch that respectively switch the traveling direction of the vehicle to the forward direction and reverse direction, and which transmits a driving torque of an engine to drive wheels via the forward clutch and reverse clutch; a brake which applies a braking force to the vehicle; and a controller which outputs respective engaging force control commands to the forward clutch and reverse clutch of the transmission so that a magnitude of the vehicle driving torque is controlled by the control of engaging forces of the clutches, and which outputs a braking force control command to the brake to control the braking force, on the basis of signals indicating the selected traveling direction detected by the forward-reverse selected direction detection sensor; wherein a vehicle speed sensor that detects the vehicle speed is provided, and the controller checks the selected traveling direction detected by the forward-reverse selected direction detection sensor, and, when the selected traveling direction is switched, outputs the braking force control command to the brake so that the vehicle gradually decelerates, and controls the engaging force of the forward clutch or reverse clutch of the transmission corresponding to the selected traveling direction and the braking force of the brake before the vehicle speed detected by the vehicle speed sensor reaches zero, thus controlling a deceleration torque and acceleration torque so that the fluctuation in acceleration around a point of time at which the traveling direction of the vehicle is reversed is weakened.

In the first aspect of the invention, when the traveling direction selected by the forward-reverse selection means is reversed during the running of the vehicle, braking is first applied by the brake so that the vehicle gradually decelerates; then, before the vehicle speed reaches zero, the respective engaging forces of the forward clutch or reverse clutch of the transmission and the brake are controlled corresponding to the selected traveling direction, thus causing the acceleration torque and deceleration torque to be controlled so that the fluctuation in the acceleration around the point of time at which the traveling direction is reversed (i.e., the vehicle speed reaches zero) is weakened. For example, around the point of time at which the traveling direction is reversed, it is sufficient if the braking force applied by the brake is reduced, and the engine braking torque (during deceleration) and driving torque in the selected traveling direction (acceleration torque following the reversing of direction) according to the engaging force control of the forward clutch or reverse clutch corresponding to the selected traveling direction are set at values greater than the braking force. As a result, the fluctuation in the driving torque caused by the effect of the residual braking force of the brake after the traveling direction has been reversed, i.e., the fluctuation in the acceleration, can be weakened; accordingly, the shock that occurs when the traveling direction is reversed can be reduced, so that swinging or collapse of the load or the like can be prevented. Furthermore, since the clutch in the selected traveling direction is already substantially engaged when the traveling direction is reversed, so that the driving torque is set at a larger value than the braking force, the rise of the acceleration torque following the reversal of the traveling direction is rapid, so that rapid acceleration is possible.

In a second aspect of the present invention, based on the first aspect of the invention, the device has a construction in which the controller controls the engaging force of the forward clutch or reverse clutch of the transmission corresponding to the selected traveling direction and the braking force of the brake so that the acceleration around the point of time at which the traveling direction of the vehicle is reversed is maintained at a substantially constant value.

In the second aspect of the invention, since the acceleration around the point of time at which the traveling direction is reversed is maintained at a substantially constant value, the shock caused by fluctuation in the acceleration at the time of reversal of the traveling direction can be eliminated; accordingly, swinging or collapse of the load or the like can be prevented. Furthermore, after the traveling direction is reversed, since the clutch in the selected traveling direction is already engaged, this driving torque can immediately be used as acceleration torque, so that the rise of the acceleration torque following the reversal of direction is rapid, thus allowing rapid acceleration.

In a third aspect of the present invention, based on the first or second aspect of the invention, the device has a construction in which the controller adjusts the braking force of the brake to a value of substantially zero before the vehicle speed detected by the vehicle speed sensor reaches zero.

In the third aspect of the invention, since the braking force applied by the brake is adjusted to a value of substantially zero before the traveling direction is reversed, only the engine braking torque based on the engaging force control of the forward clutch or reverse clutch corresponding to the selected traveling direction acts as a braking torque until the vehicle speed subsequently reaches zero. Accordingly, the fluctuation in the acceleration when the vehicle is stopped and after the traveling direction is reversed can be kept to an extremely small fluctuation. In particular, in the case of constant-acceleration control, since it is necessary to control only the engaging force of the forward clutch or reverse clutch corresponding to the traveling direction, control can easily be accomplished.

DESCRIPTION OF THE PREFERRED EMBODIMENTS

An embodiment of the present invention will be described in detail below with reference to the attached figures.

Figure 1:
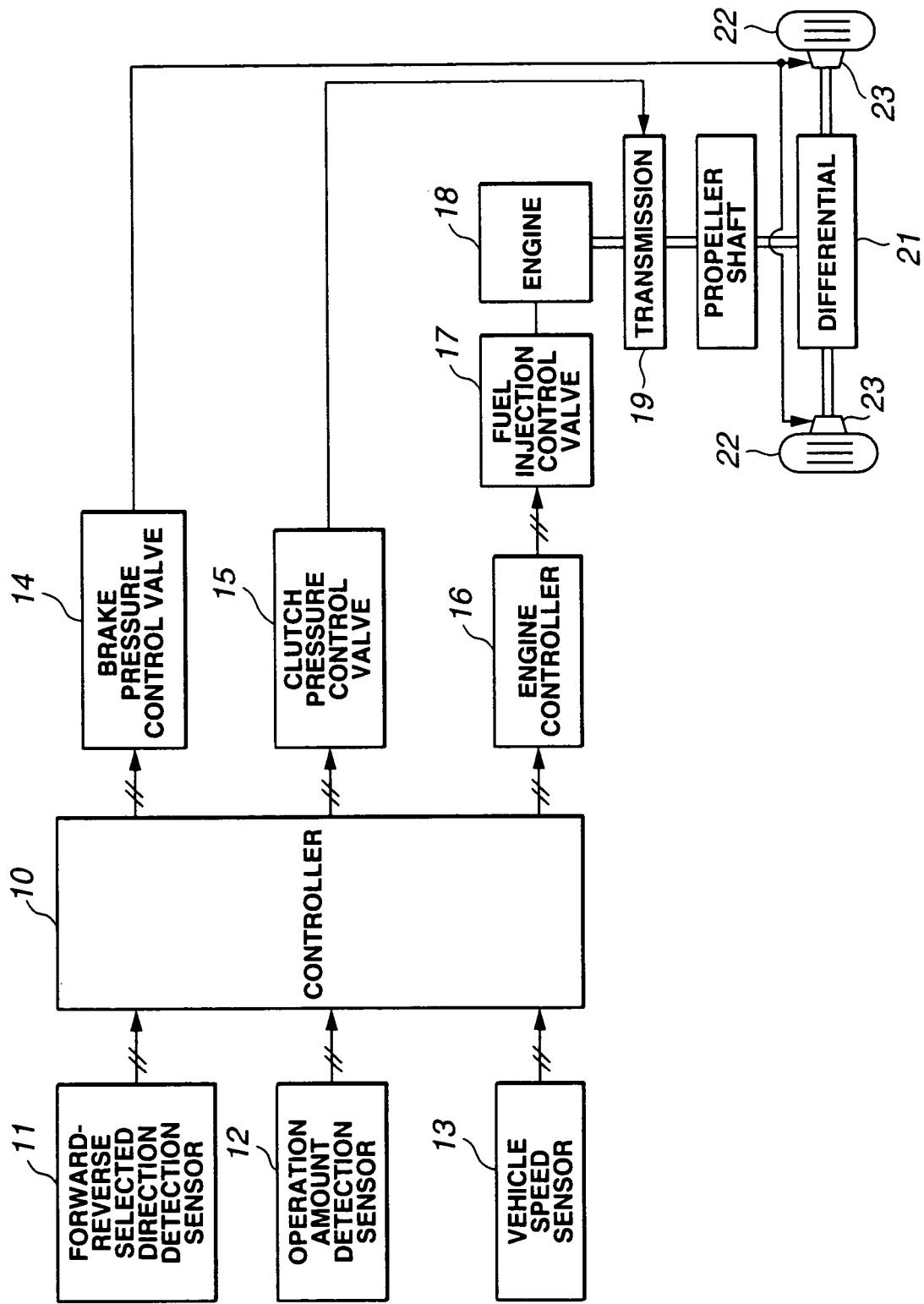
FIG. 1 is a structural block diagram of a running control device constituting an embodiment of the present invention.

First, the construction will be described with reference to the structural block diagram of a running control device constituting an embodiment of the present invention shown in FIG. 1.

The forward-reverse selected direction detection sensor 11 detects whether the traveling direction selected by forward-reverse selection means that switch between forward travel and reverse travel (e.g., a forward-reverse lever (not shown in the figures) or the like) is the forward direction or reverse direction, and outputs a detection signal to the controller 10. For example, this forward-reverse selected direction sensor 11 comprises a limit switch, proximity switch or the like.

The operation amount detection sensor 12 detects the amount of operation of accelerator means such as an accelerator pedal, accelerator lever or the like (not shown in the figures), and outputs the detection result to the controller 10. For example, the operation amount detection sensor 12 comprises a potentiometer or the like that detects the rotational angle of the accelerator pedal or accelerator lever.

The vehicle speed sensor 13 detects the speed and traveling direction of the industrial vehicle, and outputs the resulting speed signal and traveling direction signal to the controller 10. For example, this vehicle speed sensor 13 is attached to the axle on which the vehicle wheels 22 are mounted, or to the propeller shaft or the like, and is constructed from an electromagnetic pickup sensor, pulse encoder or the like that detects the number of rotation and direction of rotation of this axle or propeller shaft.

Furthermore, the abovementioned electromagnetic pickup sensor is constructed, for example, from a sensor in which a Hall IC is disposed between a permanent magnet and a magnetic circuit forming member (ordinarily made of iron) that is disposed facing this permanent magnet. Two such sensors are disposed in the vicinity of the outer circumferential part of an iron gear disposed on a rotating part subject to vehicle speed detection so that these sensors are shifted in phase by 90° in the direction of rotation. Then, when the magnetic field that is formed between the permanent magnets and magnetic circuit forming members inside the two sensors varies with the rotation of the gear of the rotating part, the phase and magnitude of the variation in the magnetic field is detected by the Hall IC for each of the sensors, so that the rotational angle and direction of rotation of the gear can be detected. In other words, the rotational angle can be detected even at an extremely low speed. Alternatively, for example, the speed detection sensor 13 may be constructed from a sensor in which a coil is wound around the circumference of a permanent magnet, and two such sensors are disposed in the vicinity of the outer circumferential part of an iron gear disposed on a rotating part so that these sensors are shifted in phase by 90° in the direction of rotation in the same manner as described above. Then, when the magnetic fields of the permanent magnets in the two sensors vary with the rotation of the gear of the rotating part, the phase and magnitude of the alternating-current voltage that is generated by the two coils is detected; accordingly, the rotational angle and direction of rotation of the gear can be detected (in the case of this sensor, it is difficult to detect the revolution at extremely low speeds; however, detection at moderately low speeds or greater is easy). Furthermore, this vehicle speed sensor 13 may be devised so that only the vehicle speed is detected, and so that the traveling direction is detected by considering the traveling direction to have been reversed when the vehicle speed is reduced and then again increased after temporarily reaching zero.

Furthermore, a transmission 19 is connected to the output shaft of the engine 18, and the output motive force of this transmission 19 is transmitted via a propeller shaft and differential 21 to the left and right vehicle wheels 22, 22 that are respectively attached to the front and rear axle of the vehicle. Brakes 23 are respectively mounted on the rear vehicle wheels 22, 22, and the brake pressure (braking force)

of these brakes 23 is controlled via a brake pressure control valve 14 that receives brake pressure control commands from the controller 10.

Furthermore, a forward clutch and reverse clutch (not shown in the figures) are disposed inside the transmission 19, and switching between forward and reverse travel is performed by these respective clutches. Furthermore, for example, respective speed stage clutches for a first speed, second speed and third speed may be disposed inside the transmission 19, and the system may be devised so that the switching of the respective speed stages is accomplished by the operation of a speed stage selection lever not shown in the figures. The clutch pressure (engaging force) of these respective clutches is controlled via a clutch pressure control valve 15 which receives clutch pressure control commands from the controller 10.

Furthermore, the revolution of the engine 18 is controlled via a fuel injection control valve 17 by an engine controller 16 that receives revolution commands from the controller 10. The engine controller 16 is constructed from a computer such as a microcomputer or the like.

Furthermore, the controller 10 is constructed from a computer such as a microcomputer or the like; this controller 10 inputs the detection signals of the respective sensors 11, 12 and 13, performs specified control processing (as will be described in detail later) on the basis of these detection signals, and controls the braking force of the brakes 23, the engaging force of the respective clutches of the transmission 19 (i.e., the transmitted driving force), the revolution of the engine 18 and the like. As a result, when the forward-reverse selection means are switched during the running of the vehicle so that the opposite traveling direction is selected, the deceleration during the deceleration of the vehicle, and the acceleration during the acceleration of the vehicle after the traveling direction has been reversed, are controlled to substantially constant values, so that no speed change shock is generated.

Figure 2:
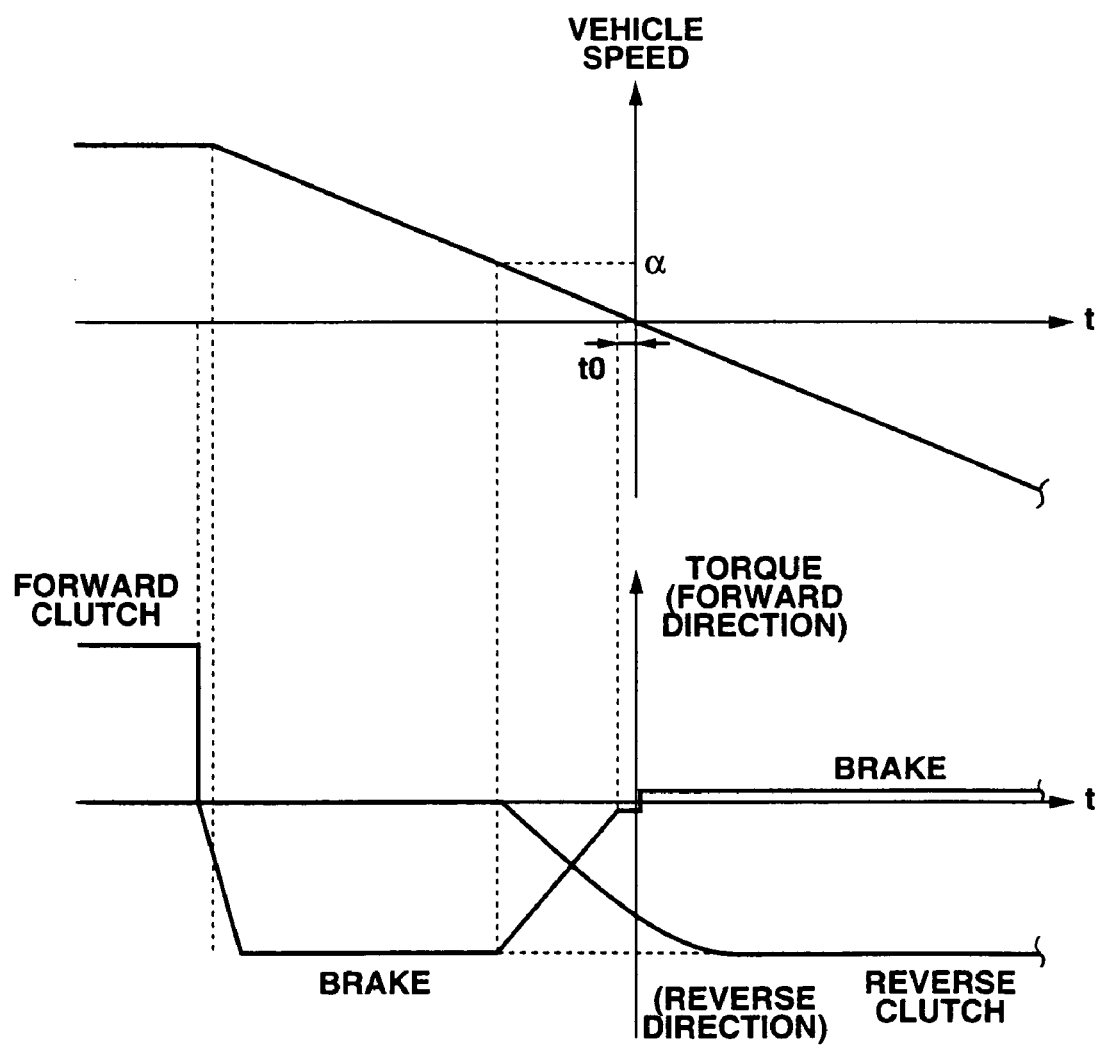
FIG. 2 is a timing chart which illustrates the operation of the running control of the present invention.

Next, the control processing procedure in the abovementioned construction will be described with reference to FIG. 2. Furthermore, a case in which the forward-reverse selection means (forward-reverse lever) are switched from the "forward position" to the "reverse position" will be described below; however, conditions are similar in the opposite case.

i) When a switch is made from "forward travel" to "reverse travel" during running:

The controller 10 receives a detection signal from the forward-reverse selected direction detection sensor 11 that has switched from "forward travel" to "reverse travel", and outputs a clutch pressure control command that disengages the forward clutch of the transmission 19 to the clutch pressure control valve 15, so that the transmission of the driving force of the engine to the front and rear vehicle wheels 22, 22 is intercepted; next, the controller 10 outputs a specified constant brake pressure command to the brake pressure control valve 14. Furthermore, the controller 10 subsequently outputs an idling revolution command to the engine controller 16 of the engine 18. As a result of the above, the vehicle speed is gradually reduced at a substantially constant acceleration.

ii) When the vehicle speed drops to a specified value or less:

The controller 10 monitors the vehicle speed detected by the vehicle speed sensor 13, and, when this speed drops to a specified vehicle speed α or less, gradually reduces the brake pressure control command that is output to the brake pressure control valve 14, so that the braking torque of the brakes 23 is reduced, and gradually increases the clutch pressure control command that is output to the clutch pressure control valve 15 so that the engaging torque of the reverse clutch of the transmission 19 gradually increases. As a result, the vehicle is braked by the braking torque of the brakes 23 and the engine braking that is caused by the engagement of the reverse clutch. Furthermore, the reverse clutch transmits a reverse-direction torque while slipping. In this case, the torque obtained by adding the braking torque of the brakes 23 during this period and the engine braking torque caused by the engagement of the reverse clutch is set so that the reduction in the vehicle speed is substantially constant. For example, in order to maintain the deceleration at a substantially constant value, the controller 10 calculates the deceleration on the basis of the vehicle speed detected by the vehicle speed sensor 13, and calculates and outputs the brake pressure control command and clutch pressure control command for the reverse clutch so that the variation in this deceleration is kept within a specified range. Furthermore, the system may also be devised so that the controller 10 stores the output pattern of the brake pressure control command and clutch pressure control command for the reverse clutch in memory beforehand, so that the torque obtained by adding the braking torque and engaging torque of the reverse clutch satisfies conditions which are such that the deceleration is substantially constant, and the brake pressure and clutch pressure of the reverse clutch are controlled on the basis of this output pattern.

Here, in the abovementioned processing, the brake pressure is controlled so that the braking torque becomes substantially zero at a specified time of t0 prior to the point of time at which the vehicle speed reaches 0. Accordingly, the brakes are released prior to the reversal of the traveling direction of the vehicle, and the deceleration torque (braking torque) that is used to decelerate the vehicle after this point is generated only by the engine braking torque created by the engagement of the reverse clutch. As a result, after the traveling direction of the vehicle is reversed, acceleration in the reverse direction by the driving force generated by the reverse clutch can be immediately and smoothly accomplished without being affected by the braking force of the brakes; accordingly, fluctuations in the acceleration can be suppressed, so that constant-acceleration control can be securely accomplished.

In this case, furthermore, the reason that the brake pressure control command that is output to the brake pressure control valve is not completely reduced to zero, as is shown in the figures, is to keep the cylinders of the brakes 23 filled with oil, so that the speed of the rise of the brake pressure in the next braking operation is increased, i.e., so that the response of the braking torque is improved. Here, it is assumed that the braking torque in a state in which the cylinders of the brakes 23 are filled with oil as described above is small enough so that this torque can be substantially ignored.

Furthermore, in regard to the method used to control the magnitude of the engine braking torque created by the engagement of the reverse clutch, the magnitude of the engine braking torque may be controlled to an optimal value not only by relying on control of the clutch engaging force by clutch pressure modulation control of the reverse clutch as described above, but also by controlling the revolution of the engine 18 via the engine controller 16, or by using both types of control in combination. If such control is performed, then when the deceleration obtained using only the reverse clutch engaging force control is insufficient because of the conditions of the running road surface (e.g., downhill slope or the like), the engine braking torque can be increased by increasing the revolution of the engine 18 via the engine controller 16 on the basis of the calculated deceleration when this deceleration exceeds a specified value, thus allowing more reliable control with a good response so that the deceleration is substantially constant.

iii) When the vehicle stops, and the traveling direction is reversed to the reverse direction:

When the vehicle speed reaches zero, the vehicle is caused to initiate running in the reverse direction by the driving torque created by the transmitted force of the reverse clutch. In this case, since the braking torque generated by the brakes 23 is already substantially zero, and driving torque control that depends only on the control of the engaging torque of the reverse clutch is being performed, no braking torque acts in the reverse direction when the vehicle stops (vehicle speed=0), or even when the traveling direction is subsequently reversed to the reverse direction. Accordingly, fluctuations in the magnitude of the vehicle acceleration that occur when the traveling direction is reversed from the forward direction to the reverse direction are eliminated, so that the vehicle is controlled at a substantially constant acceleration.

Next, in order to accelerate the vehicle to a specified speed at a substantially constant acceleration after the traveling direction has been reversed to the reverse direction, the clutch pressure of the reverse clutch is gradually raised to 100%, so that the torque transmitted by this clutch is gradually increased, and when this torque reaches 100%, the vehicle is accelerated in the reverse direction by this 100% transmitted torque, so that the speed of the vehicle is raised to the specified speed. In this case, furthermore, it would also be possible to increase the engine driving torque in a smooth manner by controlling the engine revolution.

Furthermore, the construction of the above embodiment is not limited to the construction described above; it goes without saying that other constructions may also be used as long as these constructions are capable of achieving the object of the present invention.

For instance, an example using hydraulic brakes and hydraulic clutches was described; however, it would also be possible to use electromagnetic brakes and electromagnetic clutches or the like.

Furthermore, the acceleration amount detection sensor 12 is not limited to a rotary type potentiometer; it would also be possible to use a linear position sensor or the like.

Moreover, the controller 10 and engine controller 16 were constructed separately; however, it would also of course be possible to use a construction in which both of these controllers are combined into a single controller.

As was described above, the present invention offers the following merits:

When the traveling direction selected by the traveling direction selection means is switched during the running of the vehicle, the vehicle is first gradually decelerated by the braking applied by the brakes. Then, when the vehicle speed drops below a specified speed, the braking force of the brakes and the engine braking torque created by the engagement of the forward clutch or reverse clutch of the transmission corresponding to the selected traveling direction are both controlled before the vehicle speed reaches zero. As a result, the deceleration torque prior to the reversal of direction and the acceleration torque following the reversal of direction are controlled to substantially constant values so that the fluctuations in acceleration around the point of time at which the traveling direction is reversed (i.e., the vehicle speed reaches zero) are reduced. For example, this can be realized by reducing the braking force of the brakes to a value that is smaller than the engine braking torque generated by the clutch engagement, or reducing the braking force of the brakes to a value that is substantially zero or the like, before the traveling direction is reversed. Accordingly, as a result of this, the shock that occurs when the traveling direction is reversed can be reduced, so that swinging or collapse of the load or the like can be prevented. Furthermore, since the clutch in the selected traveling direction is already substantially engaged when the traveling direction is reversed, so that this driving torque is greater than the braking force, the rise of the acceleration torque following the reversal of direction is rapid, so that rapid acceleration is possible.

Furthermore, since the braking force of the brakes and the engine braking torque created by the engagement of the forward clutch or reverse clutch of the transmission corresponding to the selected traveling direction are both controlled as described above, so that the acceleration around the point of time at which the traveling direction is reversed is controlled to a substantially constant value, the shock that occurs when the traveling direction is reversed can be eliminated, so that swinging or collapse of the load or the like can be prevented. Furthermore, since the clutch in the selected traveling direction is already engaged following the reversal of the traveling direction, so that the driving torque of this clutch can immediately be used as acceleration torque, the rise of the acceleration torque following the reversal of direction is rapid, so that rapid acceleration is possible.

Since the braking force generated by the brakes is reduced to a value of substantially zero prior to the reversal of the traveling direction, only the engine braking torque based on the control of the engaging force of the forward clutch or reverse clutch corresponding to the selected traveling direction acts as a braking torque until the vehicle speed subsequently reaches 0 (zero). Accordingly, the fluctuation in the acceleration when the vehicle is stopped and following the reversal of the traveling direction can be eliminated. In particular, in the case of constant-acceleration control, since it is necessary to control only the engaging force of the forward clutch or reverse clutch corresponding to the traveling direction, control can easily be accomplished.

What is claimed is:

1. A running control device for a forklift comprising:
 a forward-reverse selected direction detection sensor which detects a traveling direction selected by forward-reverse selection means;
 a transmission which has a forward clutch and a reverse clutch that respectively switch the traveling direction of the vehicle to the forward direction and reverse direction, and which transmits a driving torque of an engine to drive wheels via the forward clutch and reverse clutch;
 a brake which applies a braking force to the vehicle; and
 a controller which outputs respective engaging force control commands to the forward clutch and reverse clutch of the transmission so that a magnitude of the vehicle driving torque is controlled by the control of engaging forces of the clutches, and which outputs a braking force control command to the brake to control the braking force, on the basis of signals indicating the selected traveling direction detected by the forward-reverse selected direction detection sensor; wherein
 a vehicle speed sensor that detects the vehicle speed of the forklift is provided, and the controller checks the selected traveling direction detected by the forward-reverse selected direction detection sensor, and, when the selected traveling direction is switched, outputs a first clutch pressure control command that disengages the forward clutch or reverse clutch of the transmission (19) and a first braking force control command that maintains a braking torque by the brake (23);

when the vehicle speed detected by the vehicle speed sensor (13) becomes a specified vehicle speed α or less, outputs a second clutch pressure control command that gradually increases an engaging torque for the forward clutch or reverse clutch of the transmission (19) and a second brake pressure control command that gradually decreases the braking torque by the brake (23);

at a specified time of t0 prior to the point of time at which the vehicle speed reaches zero, outputs a third brake pressure control command that causes a braking torque by the brake (23) to be substantially zero; and when traveling direction of the forklift is reversed, outputs a third clutch pressure control command that gradually increases the engaging torque for the forward clutch or the reverse clutch of the transmission (19) until the clutch pressure is raised to 100%, whereby deceleration and acceleration of the forklift is maintained substantially constant during a period of time from the switching operation of traveling direction until a clutch pressure is raised to 100% after the reversal of the traveling direction.

2. The running control device for a forklift according to claim 1, wherein the brake controls the braking torque according to pressure oil in a cylinder, and the cylinder is filled with the pressure oil so that the braking torque is zero around the point of time at which the traveling direction of the vehicle is reversed.

* * * * *